Figures 5, 6:
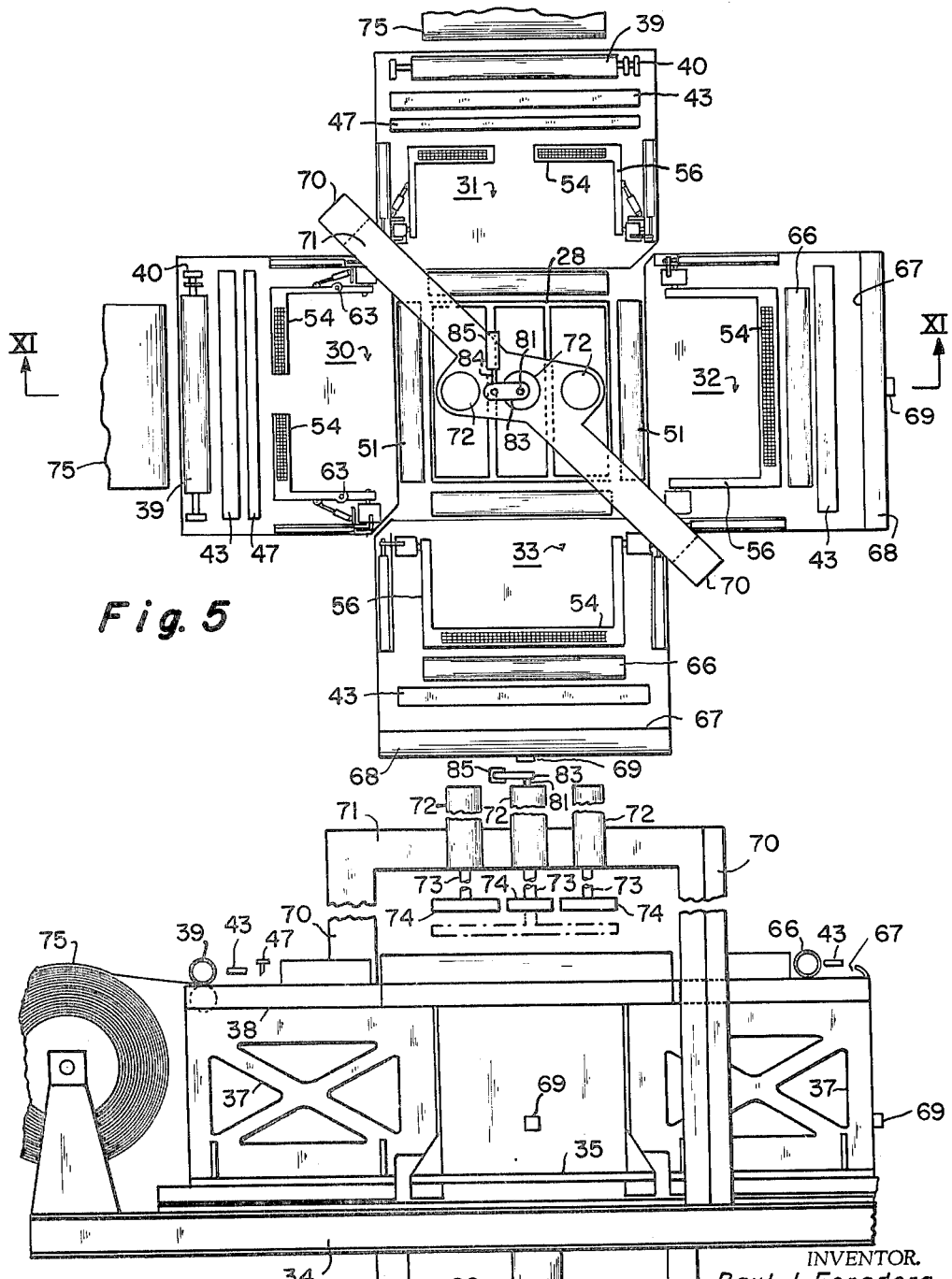

May 31, 1966 P. J. FORADORA 3,253,379
METHOD OF BANDING A GROUP OF ARTICLES
Filed May 16, 1962 5 Sheets-Sheet 1
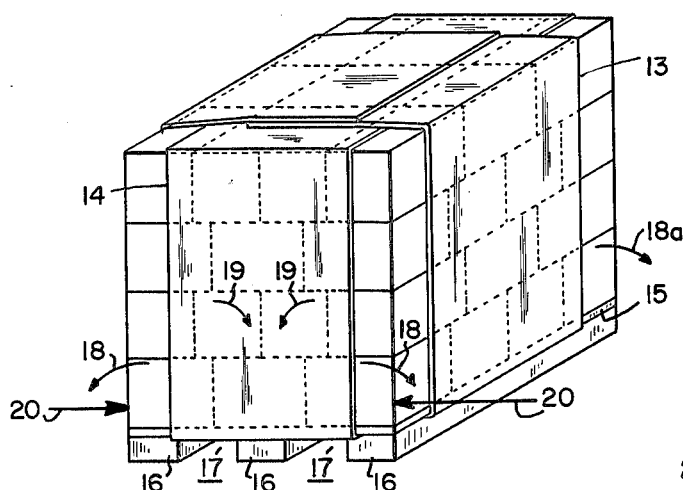
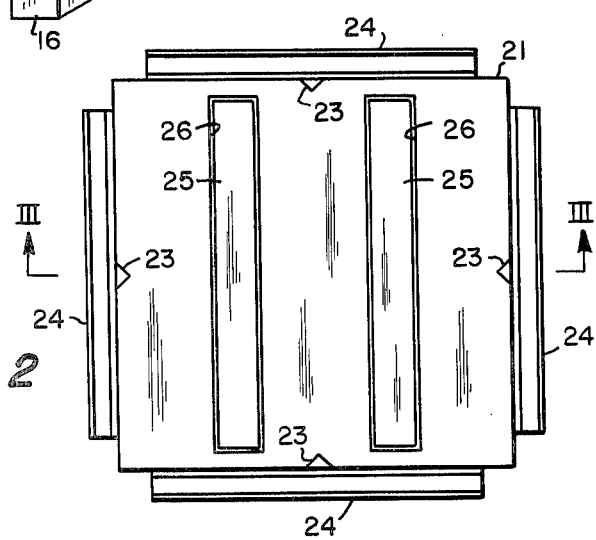
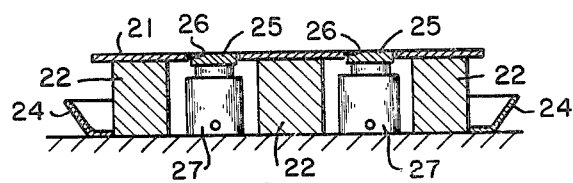
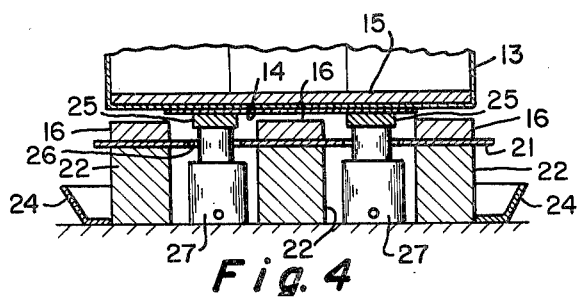
INVENTOR.
Paul J. Foradora
BY
Webb Mackey + Burden
HIS ATTORNEYS INVENTOR.
Paul J. Foradora May 31, 1966   P. J. FORADORA   3,253,379
METHOD OF BANDING A GROUP OF ARTICLES
Filed May 16, 1962   5 Sheets-Sheet 3

INVENTOR.
Paul J. Foradora
BY
Webb Mackey + Burden
HIS ATTORNEYS

May 31, 1966    P. J. FORADORA    3,253,379
METHOD OF BANDING A GROUP OF ARTICLES
Filed May 16, 1962    5 Sheets-Sheet 4

INVENTOR.
Paul J. Foradora
BY Webb Mackay & Burden
HIS ATTORNEYS

May 31, 1966  P. J. FORADORA  3,253,379
METHOD OF BANDING A GROUP OF ARTICLES
Filed May 16, 1962  5 Sheets-Sheet 5

INVENTOR.
Paul J. Foradora
BY
Webb, Mackey & Burden
HIS ATTORNEYS

United States Patent Office 3,253,379
Patented May 31, 1966

3,253,379
METHOD OF BANDING A GROUP OF ARTICLES
Paul J. Foradora, R.D. 1, Falls Creek, Pa.
Filed May 16, 1962, Ser. No. 195,113
2 Claims. (Cl. 53—3)

This application relates to new and useful improvements in method and apparatus for packaging. More specifically, it relates to method and apparatus for packaging a plurality of relatively small articles into a single handling unit whereby the articles may be handled for shipping and storage as a single unit of convenient size and shape.

Many articles of relatively small size are individually handled during shipping and storage either unpacked or packed in cartons and boxes also of relatively small size. Such articles have been handled individually even though it is laborious, time-consuming and therefore expensive because no satisfactory way of handling them economically in units of larger size has been developed.

Heretofore a plurality of relatively small articles have been combined into a single unit of larger size for handling by placing them on a pallet and lifting and moving the pallet with a forklift truck. A large number of small articles can be handled as single larger units in this manner but the use of such pallets has many objections. The pallets have to withstand the loads imposed upon them and rough handling and therefore, they are heavy and occupy a considerable amount of space. The problem of space occupied by the pallets is particularly acute during transportation. Also they are expensive and therefore they must be returned empty after use, and they occupy storage space when not being used.

I have invented method and apparatus for packaging relatively small articles whereby a number of such articles can be handled as a single unit without pallets. These articles may be unpacked or they may be packed in individual cartons or a number of articles may be packed in a single carton, which is also small relative to the size of a unit which can conveniently and economically be handled, for example on a forklift truck. Throughout this specification and claims the word article includes any object which presents at least four side surfaces against which pressure may be applied and which is of such size that it is desirable to combine it with similar objects into a larger unit for economic handling during shipping and storage.

In carrying out my method, I lay out a long strip of paper on a flat surface and stack on the paper the articles which are to form the handling unit. The articles are stacked on the paper and on each other so as to form a handling unit having the desired dimensions, shape and weight. They are positioned on the paper strips so that portions of the strip extend out from under the unit on opposite sides of the unit of sufficient length to be wrapped around a side and across most of the top of the unit. Preferably, the articles are stacked so as to form a square or rectangle shaped handling unit which can be lifted and moved by a forklift truck. After the articles are stacked into the unit, tension is placed on the paper beneath the articles and the extending strip portions are brought up against the sides of the unit and folded over the top of the unit. When each length of paper is brought up along the side of the unit and across the top of the unit, tension which was exerted on the portion of the strip beneath the unit is maintained. The two ends of the strip are overlapped on each other on the top of the unit and secured to each other by an adhesive.

The paper strip used for binding the articles has sufficient width so that it covers at least a portion of each article which forms part of the corner edges of the unit. As noted, the strip has sufficient length to extend across the bottom of the unit, up both sides of the unit and across the top of the unit. Any paper having sufficient strength to withstand the tension applied to the strip beneath the stacked articles can be used. The amount of tension required depends upon the weight of the articles and the weight of the finished handling unit and also the dimensions of this unit. The amount of tension to be applied in any particular case can readily be determined by trial. A paper which I have found to be especially suitable for carrying out my method of packaging is that known as "extensible paper" which has resiliency and can be stretched. The United States Patent No. 2,624,245 granted to S. L. Cluett describes such an extensible paper.

Figure 7:
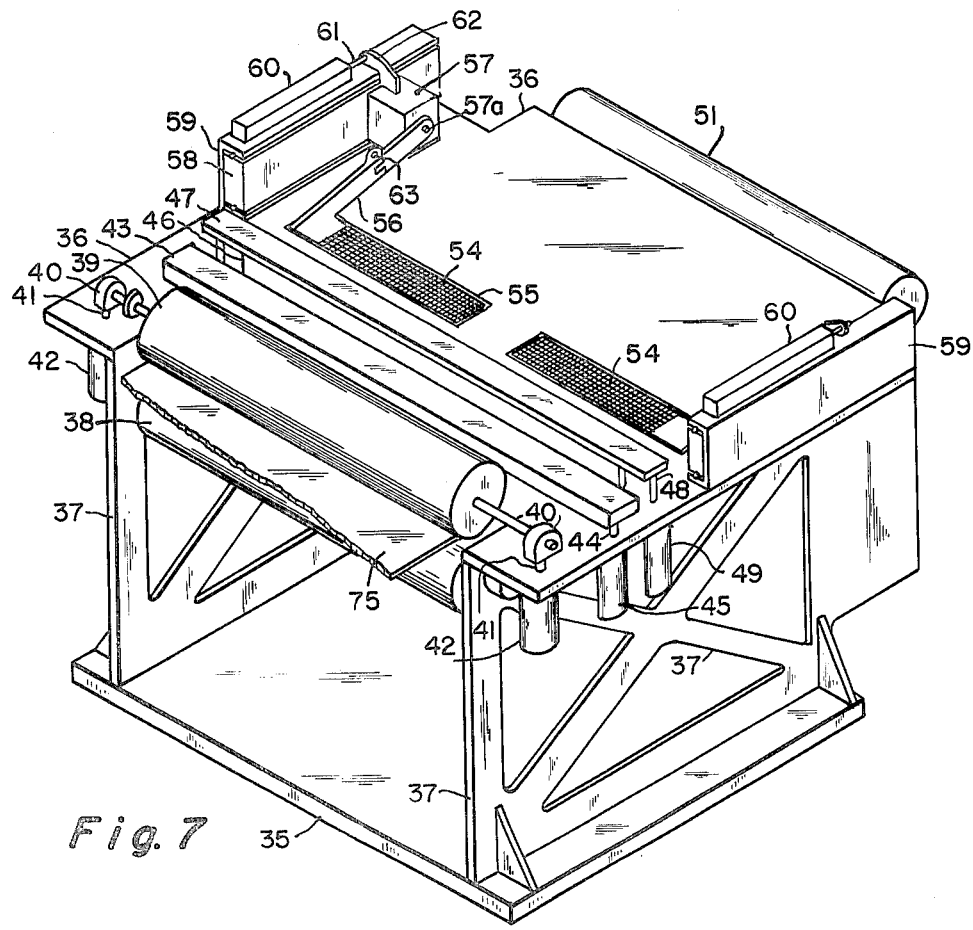
Figure 8:
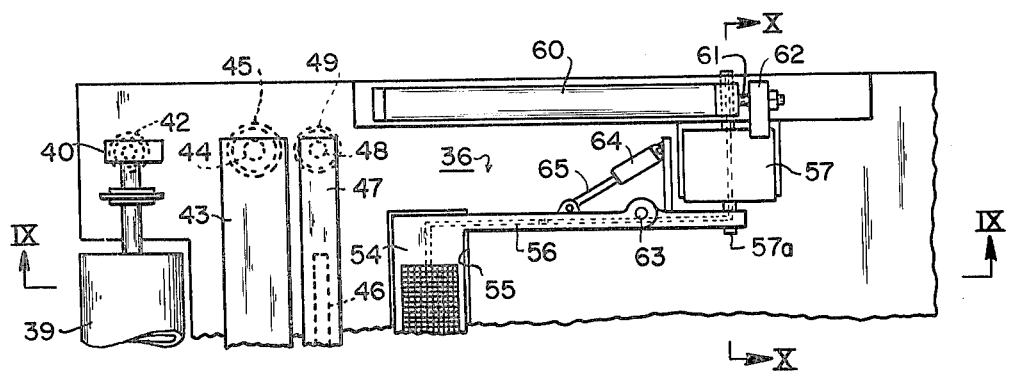
Figure 9:
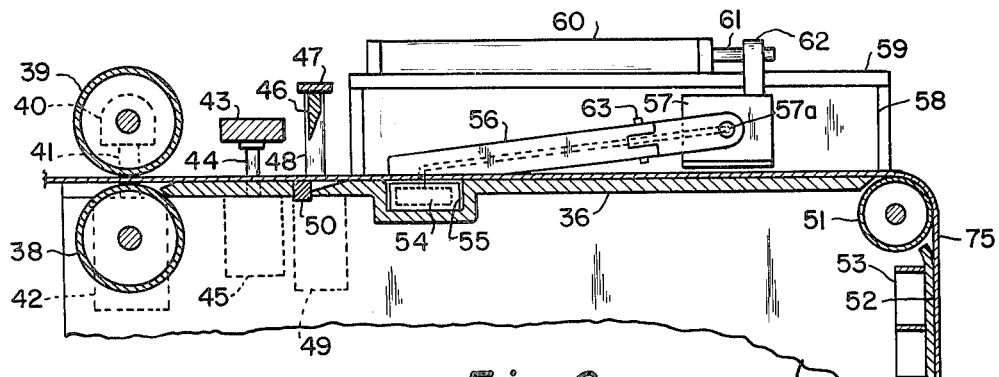
Figure 10:
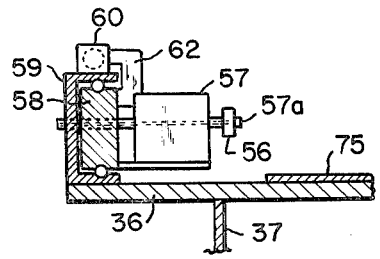
Figure 12:
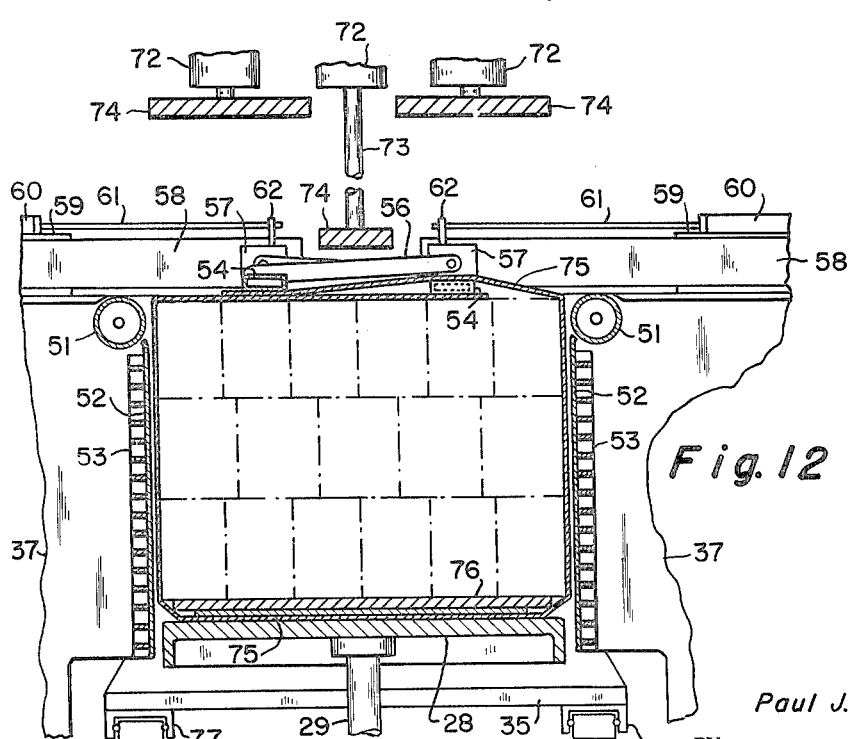
Figure 11:
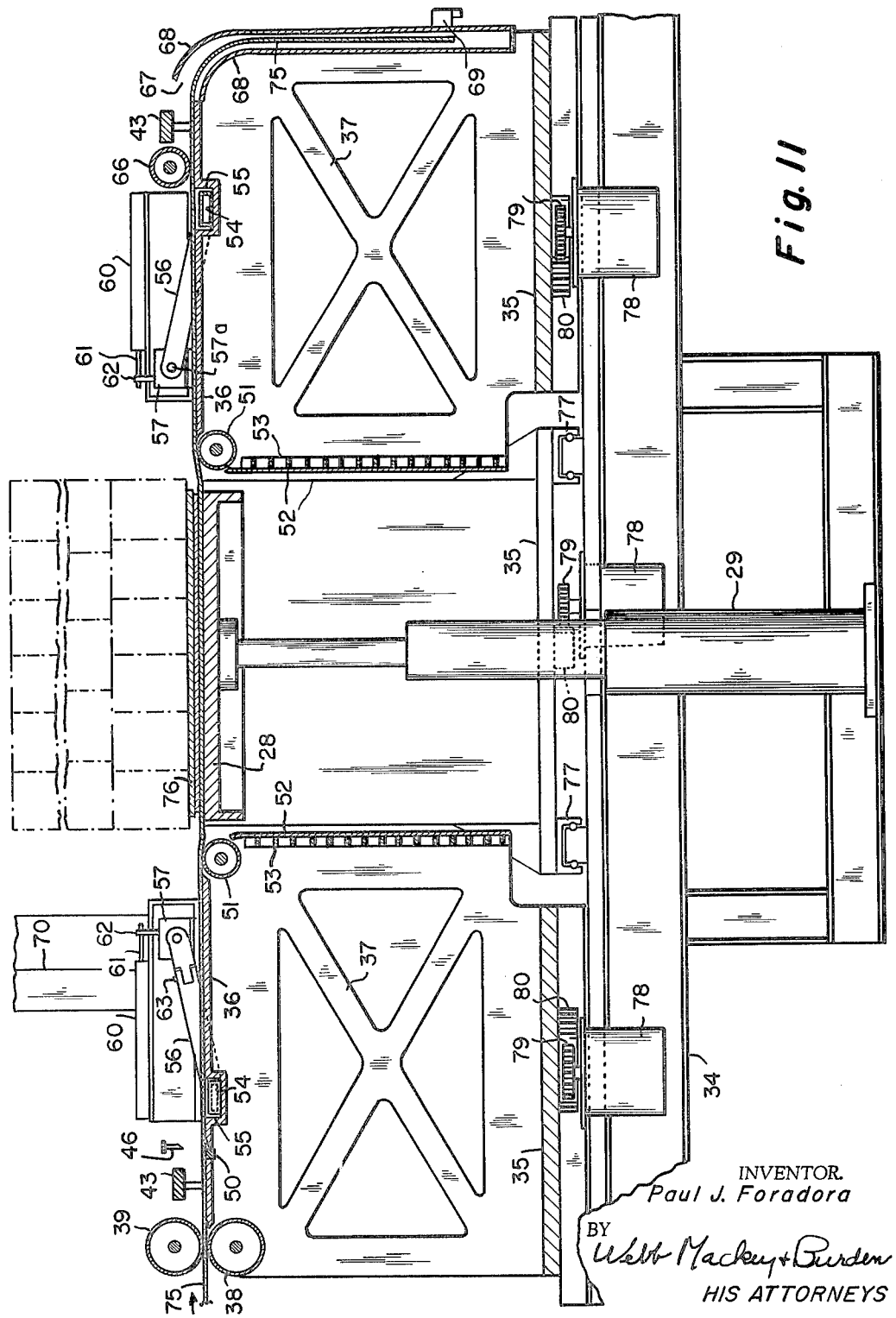

In the accompanying drawings I have illustrated certain presently preferred embodiments of my invention in which:

FIGURE 1 is an isometric view of a handling unit formed in accordance with my invention, FIGURE 2 is a plan view of apparatus used for manually carrying out my invention, FIGURE 3 is a section along the lines III—III of FIGURE 2, FIGURE 4 is a section similar to FIGURE 3 but showing the apparatus in a different operative position, FIGURE 5 is a plan view of apparatus for mechanically carrying out my method of packaging, FIGURE 6 is a side view of the apparatus shown in FIGURE 5, FIGURE 7 is an isometric view of a portion of the apparatus of FIGURE 5, FIGURE 8 is a partial plan view of the apparatus shown in FIGURE 7, FIGURE 9 is a section taken along the lines IX—IX in FIGURE 8, FIGURE 10 is a partial section taken along the lines of X—X of FIGURE 8, FIGURE 11 is a section along the lines of XI—XI of FIGURE 5, and FIGURE 12 is a partial section also taken along the lines of XI—XI, but showing the apparatus in a different operative position than that shown in FIGURE 11.

Referring to the drawings, FIGURE 1 shows a handling unit which has been formed in accordance with my invention. A plurality of articles, for example rectangular cardboard boxes containing glassware, have been stacked into a rectangular handling unit and a strip of paper 13 has been wrapped around the unit. The articles were stacked on the paper strip 13 and after a unit of the desired size and shape was formed, the ends of the strip 13 extending outwardly from each side of the unit were pulled in opposite directions to exert a tension on the strip beneath the unit while still maintaining tension on the strip. Each portion of the strip extending out from the unit was then brought up along a side of the unit and over the top of the unit while still maintaining tension on the strip. While still under tension the ends of the strip portions were overlapped on the top of the unit and secured together by adhesive.

The unit shown in FIGURE 1 also has a second paper strip 14 which has been applied to the handling unit at right angles to the strip 13. This strip 14 has been applied to the unit in the same manner as the strip 13. In many instances only one strip will be required, however, it is desirable to use two strips extending around the unit at right angles to each other as shown in FIGURE 1 in order to hold the articles together as a unit when the unit is subjected to vibration or shock during handling. Thus if only one strip is used vibration received during shipping may work some of the articles out the open ends of the unit.

Depending upon the weight of the articles and the size and the weight of the finished handling units, it may be desirable to reinforce the paper strips and prevent stress concentrations by means of a cardboard liner 15 which has approximately the same length and width of the handling unit. The liner is placed over the paper strips 13 and 14 where they overlap and the articles are stacked on the liner.

In FIGURE 1, arrows have been added to demonstrate why my method of packaging is effective. The unit is shown in FIGURE 1 as resting on runners 16, which may be made of heavy cardboard and which are glued to the bottom of the unit to support the unit above the ground and provide elongated spaces 17 beneath the unit into which the two prongs of a forklift can be inserted to lift and move the unit.

When a unit such as that shown in FIGURE 1 is lifted by a forklift, then the articles at the corners of the unit tend to fall outwardly in the direction shown by the arrows 18. Likewise, articles in the center of the unit tend to collapse towards the center in the direction indicated by the arrows 19. The tendency of the articles to separate in the directions shown by the arrows 18 and 19 may be prevented by pressure applied to the articles in the direction indicated by the arrows 20. In accordance with my invention, the pressure required is provided by the tensioning of the strip 13 beneath the unit and by wrapping the strip around the unit while maintaining it under tension. In effect the application of tension to the strip beneath the unit and up the sides of the unit creates a beam out of the bottom row of articles which supports the handling unit. Here it should be noted that if cylindrical articles are being packaged, they should be stacked on end. If they are stacked with their cylindrical surfaces horizontal they will tend to collapse into a circular unit which has no beam strength.

FIGURE 1 also illustrates another purpose for the second strip 14. For example, if the forks of the forklift truck do not extend the full length of the handling unit, the articles forming the back end of the unit will have a tendency to turn outwardly and rearwardly in the direction indicated by the arrows 18a in FIGURE 1. The strip 14 will prevent this tendency. Also if transversely aligned openings are made in the runner 16, a forklift can be inserted beneath the handling unit at right angles to the runners 16. If this is done, then the strip 14 will be required for the same reasons as strip 13.

From FIGURE 1, it will be seen that the runners 16 should extend beneath the unit at right angles to the direction in which the strip 13 is wrapped around the unit so that when the unit is lifted, the strip 13 will apply compressive force in the right direction to counteract the forces tending to separate. As noted above, however, it is preferable to wrap the unit with another binding strip extending at right angles to the first strip and this strip should be placed beneath the first strip before articles are stacked on them so that it will be beneath and protect the strip which resists the tendency of the unit to separate when the unit is lifted.

FIGURES 2 to 4 inclusive illustrate apparatus useful for carrying out my method manually. It includes a flat horizontally extending platform or support 21 which is supported above ground or floor level by beams 22. The top of the support has centering guides 23 to enable a person to center paper strips on the platform. Trays 24 beneath the edges of the platform hold the portions of the paper strips which extend beyond the platform.

Two lifting beams 25 are mounted flush with the top of the support 21 in slots 26 formed in the support. The lifting beams are mounted on hydraulic jacks 27 and are used to raise a unit after it has been completed on the support.

In carrying out my method, two paper strips of sufficient length to wrap around the completed unit are placed on the table so that they extend at right angles to each other and cross at approximately their centers on the table or support. The strips have sufficient width so that as shown in FIGURE 1, they engage at least a portion of the articles which form the corner edges of the finished unit. The articles are stacked on the portions of the strips which overlap until a handling unit of the desired shape and size is formed. The two strips are then wrapped one at a time around the unit and the ends of the strips are secured to each other by overlapping them across the top of the unit and securing the ends to each other by gluing, adhesive, etc.

As has been explained above, tension is applied to the portion of the strip beneath the stacked articles before the strip is wrapped around the unit, and this tension is maintained while the strip is being wrapped. The tension is provided by two persons pulling in opposite directions on the ends of the strip. A convenient way to hold the strips while thus applying tension is to wrap it around a rod which has sufficient length to extend out beyond the edges of the strip four or five inches and provide a hand grip on each side of the strip.

If the weight of the finished handling unit is high, it may exert so strong a downward force on the support 21 that due to friction it will be difficult to exert sufficient tension on the strip beneath to the articles to make a finished handling unit of the desired strength. In that event, the strip can be tensioned and maintained under tension while articles are being stacked on it to form a unit.

FIGURE 4 illustrates how runners can be secured to the bottom of a finished handling unit. After two strips 13 and 14 have been wrapped around a unit, the hydraulic jacks 27 are actuated to raise the lifting beams 25 which in turn lift the unit from the platform 21. Adhesive is placed on the top surfaces of the runners 16 and they are placed on the support 21 beneath the handling unit, and the jacks 27 are lowered so that the unit comes down on top of the runners and is secured to the runners by the adhesive.

FIGURES 5 to 12 inclusive show apparatus whereby my method of packaging can be carried out mechanically. In this apparatus, two strips of paper are laid out at right angles in the form of a cross. Beneath the portions of the two strips which overlap, there is a vertically movable support which can be moved downwardly between four vertically extending and horizontally movable pressure plates which form the sides of a box around the movable support when the support is moved downwardly between them.

If needed, a cardboard base liner is laid on top of the paper strips over the area where they overlap and articles to be packaged are stacked on the cardboard to form a unit of the desired size. Thereupon, the entire unit is pressed downwardly between the four side pressure plates. Rollers positioned parallel to and adjacent to the edges of the vertically movable support when it is in its raised position support the paper strips in a vertically fixed position so that when the stacked articles are lowered between the pressure plates, the paper strips are pulled downwardly over the rollers and are pressed against the sides of the handling unit by the pressure plates.

The outer ends of the strips are held by back tension devices which exert a back drag on the strips when they are pulled downwardly between the pressure plates. Therefore, when the unit is pressed downwardly between the pressure plates, tension is exerted on the portions of the strips beneath the unit and the tension is maintained as the unit is being moved downwardly between the pressure plates. When the top of the unit is approximately at the level which the movable support had before articles were stacked on it, swinging arms fold the ends of the paper strips over the top of the unit in overlapping position where they may be secured to each other.

Referring to FIGURES 5 and 6, a flat horizontally extending support 28 in the form of a flat plate is mounted for vertical movement on a hydraulic lift 29. Adjacent each side of the plate 28 is a pressure plate assembly marked generally by the reference numbers 30, 31, 32 and 33 in FIGURE 5. One of the two pressure plate assemblies 30 and 31 is shown in FIGURE 7. The pressure plate assemblies are movable horizontally towards and away from the plate 28 on beams 34 which form the main base for the apparatus.

Referring to FIGURE 7, each of the two pressure plate assemblies 30 and 31 comprises a rectangular frame having a base plate 35, a top plate 36 and supporting sides 37. The top plate 36 carries a pair of paper feed rolls 38 and 39, the bottom roll 38 being journalled in the sides 37 and the top roll 39 being carried in trunnions 40 which in turn are mounted on pistons 41 which move in hydraulic cylinders 42 secured to the under side of the plate 36. Pressure exerted by the feed rolls 38 and 39 on the paper is determined by the pressure maintained on the cylinders 42.

Each pressure plate assembly also has a back tension bridle in the form of a bar 43 which extends across the top surface of the top plate 36. Pistons 44 support the ends of the bar and these pistons move in hydraulic cylinders 45 mounted beneath the plate 36. The amount of pressure which the bar 43 exerts downwardly on the paper which passes between it and the top of the plate 36 can be regulated by regulating the hydraulic pressure in the cylinders 45.

The pressure plate assemblies 30 and 31 also have knives for cutting off paper strip from a supply roll of paper. Referring to FIGURE 9, the knife comprises a vertically moving blade 46 which extends across the plate 36 and which is mounted on a bar 47. Pistons 48 moving in cylinders 49 secured beneath the plate 36 support the ends of the bar 47 and move the knife blade 46 towards and away from a hardened steel insert 50 mounted in the plate 36 and forming a cutting edge for the knife blade.

A roller 51 is rotatably mounted at the end of the pressure plate assembly which is adjacent to the vertically movable support 28. As shown in FIGURE 9, the top of the roller is level with the top of the plate 36. In operation of the machine, the paper strip moves across the top of the plate 36 and over the roller 51 and thence downwardly past pressure plates 52, the pressure plates extending vertically beneath the rollers 51 and in a plane tangent to the roller. The pressure plates are made of sheet metal, for example stainless steel, and they are supported and backed up by grids 53 which extend between and are secured at their ends to the sides 37 of the frame of the pressure plate assembly.

After a stacked unit has been pressed downwardly between the pressure plates, one end of the paper strip is cut off from a supply roll and both ends of the paper strip are folded over across the top of the unit. This step is accomplished by suction arms 54 which lie in a recess 55 formed in the plate 36 beneath the paper strip. The suction arms are carried on the ends of lever arms 56 which are rotatably mounted at their opposite ends at each side of the plate 36. When a vacuum is created in the suction arms they will grasp the end of the strip and swinging on the lever arms fold the ends across the top of the unit after it has been pressed downwardly between the four pressure plates.

To swing the suction arms 54 from their position beneath the strip on the top plate 36 to a position on the top of the handling unit, the ends of the lever arms 56 are mounted on the shafts 57a of hydraulic actuators 57. These actuators comprise a shaft axially mounted within a hollow cylinder, a fixed stop and a vane mounted on the shaft. Hydraulic pressure exerted between the vane and the fixed stop rotates the shaft. A suitable hydraulic actuator for mounting the lever arms 56 is manufactured by the Ex-Cell-O Corporation of Greenville, Ohio, under the trademark "Rotac."

Referring to FIGURE 10, the shaft 57a is double-ended and extends through a mounting (which will subsequently be described) for the "Rotac," and the shaft is hollow (as are also the arms 56) so that a vacuum can be created in the suction arms 54.

The suction arms 54 must grasp the end of a portion of paper strip of sufficient length to extend across a handling unit, and the suction arm must also place the end of the paper strip across the top of the unit. In order to accomplish this, it is necessary that the suction arms not only rotate on the lever arms 56, but that the pivot points of the lever arms 56 move horizontally toward and away from handling unit. To accomplish this, the hydraulic actuators 57 are mounted on inner members 58 (see FIGURE 10) of ball slide assemblies 59 which are mounted on the side edges of the top plate 36.

A hydraulic cylinder 60 mounted on the top of each ball slide 59 carries a piston rod 61 which is secured at its outer end to the inner member 58 of the ball slide by a cross head 62. Actuation of the piston rod in the cylinder 60 together with rotation of the lever arms moves the suction arms 54 from the position shown in FIGURE 9 beneath the paper over the top of the handling unit to the position shown in FIGURE 12.

As noted the ends of the paper strip are overlapped on the top of the handling unit, and this means that the suction arm which carries the bottom strip of the overlapped strips will be beneath the paper strips when they are secured to each other. It is therefore necessary to withdraw the suction arm which carries the lower strip from beneath the two strips. This is done by making the suction arms on the pressure plate assemblies 30 and 31 in two pieces as shown in FIGURE 5.

In order to withdraw the suction arms sidewise from beneath the overlapped strips, the lever arms 56 for these suction arms are hinged as shown at 63 in FIGURES 5, 8 and 9. After the strips have been secured to each other, the suction arms are swung outwardly about the pivot 63 by means of a hydraulic cylinder 64 and piston rod 65 to withdraw the arms from beneath the paper.

Referring to FIGURES 5 and 6, the pressure plate assemblies 32 and 33 are, with certain minor exceptions, the same as the assemblies 30 and 31. However, instead of having a pair of feed rolls 38 and 39, these latter assemblies have a single roller 66 which feeds the leading edge of a paper strip downwardly into a chute 67 when the paper strip is fed across the top plates of opposed assemblies and over the vertically movable support 28 by the feed rollers 38 and 39. Referring to FIGURE 11, the chutes 67 are formed by two spaced apart metal sheets 68 which are positioned at the rear edge of the top plate 36 of the pressure plate assemblies to receive the strip as it comes across the top plate. They then curve downwardly so as to guide the paper downwardly along the rear of the pressure plate assembly. These plates extend between the side plates 37 of the pressure plate assembly and are secured to these side plates.

A photoelectric cell 69 can be mounted on one of the plates 68 adjacent the bottom of the chute 67 to cut off the power supply to the feed rolls 38 and 39 when the desired length of paper has been fed into the chute 67.

The suction arms 54 on the pressure plate assemblies 32 and 33 carry the end of the strip which is the upper of the two strips which are overlapped over the top of the handling unit, and therefore they will be on top of the overlapped end and are made in one piece instead of two.

FIGURES 6 and 12 show the mechanism which is used to force the vertically movable support 28 downwardly between the pressure plates 52 after articles have been stacked on it to form a handling unit. Two posts 70 support a beam 71 which extends diagonally across and spaced above the vertically movable support 28. The beam 71 carries three hydraulic cylinders 72, each of which has a piston rod 73, each of which in turn carries a flat rectangular plate 74.

When a unit has been stacked on the vertically movable support 28 while it is positioned at its top position, hydraulic pressure is supplied to the cylinders 72, and the plates 74 acting in unison come down upon the top of the handling unit and force it and the support 28 downwardly between the vertically extending pressure plates. Pressure is released from the hydraulic lift 29 to permit the support 28 to descend.

FIGURES 11 and 12 illustrate the operation of the packaging apparatus. Referring to FIGURE 11, hydraulic pressure is supplied to the hydraulic lift 29 to move the support 28 to the position shown in FIGURE 11 in which it is approximately level with the support rollers 51. The feed rollers 38 and 39 are actuated to feed a strip of paper 75 across top plate 36 of either plate assembly 30 or 31 across the vertically movable support 28 and across the top plate 36 of the opposed pressure plate assembly 32 or 33. The paper is then fed into the chute 67, and when the leading edge of the paper passes in front of the photocell 69, the feed rollers 38 and 39 are stopped. A second strip of paper is then fed at right angles to the paper strip 75 by the pair of pressure plate assemblies which were not used to feed the first strip of paper across the support at 28. A cardboard base liner 76 is then placed on top of the portions of the two strips where they overlap and articles to be packaged into a unit are stacked on top of the cardboard liner 76 or on top of the portions of the two paper strips which overlap if a cardboard liner is not used.

The cylinders 72 are then actuated to cause the plates 74 to descend downwardly so as to force the unit downwardly between the four pressure plates into the position shown in FIGURE 12. As has been explained, each pressure plate assembly is movable towards and away from the support 28 on the beams 34. They slide on roller slides 77 carried by the beams and are moved along the beams by "Rotacs" 78. The shafts of the "Rotacs" carry pinions 79 which mesh with racks 80 secured to the bottom plates 35 of the pressure plate assemblies. Before the handling unit is pressed down between the pressure plate assemblies, the back tension bridles 43 are brought down against the paper strips on each side of the support 28 to apply a backdrag to the strips. Therefore when the handling unit is moved downwardly between the pressure plate assemblies, tension is exerted on the strip beneath the handling unit. This tension forces the pressure plate assemblies inwardly against the sides of the handling unit so that the tension which has been applied to the portion of the strip beneath the handling unit is maintained while the handling unit descends between the pressure plates. The amount of pressure exerted against the paper strip as it is placed against the sides of the handling unit can be modified by supplying fluid pressure to the "Rotacs" 78, sufficient pressure being exerted to maintain the tension which has been created in the strip.

The vertically movable support 28 and the handling unit stacked upon it are moved downwardly until they reach the position shown in FIGURE 12 at which the top of the handling unit is approximately at the same level as the tops of the support rollers 51. The knife 46 is then lowered to cut the paper from a supply roll and the suction arms 54 are next swung and moved horizontally over the top of the handling unit to bring the two ends of the paper strip over the top and overlap them as shown in FIGURE 12.

Adhesive is applied between the two strips and the central cylinder of the cylinders 72 is actuated to lower the plate 74 which it carries down on the overlapped strips to secure them to each other. The portions of the strips which overlap on the top of the handling unit form a rectangular shape between the suction arms 54. Therefore only the central plate 74 is used to secure the overlapped strips to each other.

When the second strip is wrapped around the handling unit, it extends at right angles to the first unit and therefore the plate 74 must be turned ninety degrees. This is done by rotatably mounting the central cylinder 72 and by connecting to a shaft 81 about which it rotates a lever 83 which in turn is pivoted at its outer end to a piston rod 84. The piston rod moves in a hydraulic cylinder 85. By supplying hydraulic pressure to the cylinder 85, the center cylinder 72 can be turned to the correct position.

Any type of adhesive material may be used to hold the two overlapped strips to each other. Glue or other adhesive can be placed between them before they are overlapped or a pressure sensitive adhesive can be put on one end of the paper strip before it is folded over the top. A heat activated adhesive can also be used in which case a heating element is added to the central plate 74.

After both strips have been overlapped and secured to each other on top of the handling unit, the suction arms 54 are withdrawn and the hydraulic lift 29 is actuated to raise the support 28 to the position shown in FIGURE 11 and the handling unit removed from the support 28.

Because one of the suction arms is beneath the lower end of the overlapped ends of the paper strip, withdrawal of the suction arms by means of the cylinders and piston rods 64 and 65 will develop a slight slackness in the paper strip. However, since the paper has been folded around two corners, tension on the strip beneath the handling unit is not materially lowered. This is especially true if extensible paper is used because that paper can be stretched and when released will still exert a considerable tension on anything about which it has been wrapped under tension. Also, the nature of the paper is such that if heat is applied to it by means of a hot iron, dry steam, etc., it will shrink and take up slack created by withdrawal of the suction arms 54.

The use of the split suction arms and consequent slight release in tension can be avoided by changing the movement of the suction arm which folds the lower of the two overlapped ends of the paper strip on the top of the unit. Thus a suction arm can be swung across and moved laterally over the top of the handling unit to place the lower strip across the top of the unit whereupon the vacuum is relieved to release the paper. The suction arm is then moved backwardly across the top of the handling unit by means of the cylinder 60 and the suction arm is again brought down on the paper, but near the edge of the top of the unit and is then advanced across the top of the unit to hold the lower end of paper across the top of the handling unit. The suction arm having the upper end of the strip is then swung over to bring the upper end down in overlapping position on the lower end.

While I have described certain presently preferred embodiments of my invention, it is to be understood that it may be otherwise embodied within the scope of the appended claims:

I claim:

1. A method of packaging a plurality of articles into a single unit for handling which comprises,
    A. placing on a flat support a strip of paper, said strip having
        (1) sufficient width to cover at least a portion of those articles which form the corner edges of a unit formed by stacking a plurality of articles on the strip, and
        (2) sufficient length to extend across the bottom and up the sides and overlap its ends across the top of said unit,
    B. stacking the articles on the strip to form a handling unit of the desired size and shape, the unit being positioned on the strip so that both ends of the strip can be brought up over the top of the unit,
    C. tensioning the portion of the strip beneath the unit,
    D. folding the strip against opposite sides of the unit while maintaining tension on the strip,
    E. folding both ends of the strip *across* the top of the unit towards each other while maintaining tension on the strip, F. overlapping the ends of the strip on the top of the unit and securing the ends to each other.

2. A method of packaging a plurality of articles into a single unit for handling which comprises,
   A. placing on a flat support two strips of paper, said strips
      (1) crossing one over the other, and
      (2) extending at right angles to each other
      (3) said strips also having a width sufficient to cover at least a portion of those articles which form the corner edges of a unit formed by stacking a plurality of the articles on the strips,
      (4) said strips having sufficient length to extend across the bottom, up the sides and overlap their ends across the top of said unit,
   B. stacking the articles on the portion of the upper of said strips which overlaps the lower strip to form a handling unit of the desired size and shape,
   C. applying tension to the portions of the strips which are beneath said unit,
   D. folding each strip against the sides of said unit which extend across the strip while maintaining tension on the strip.
   E. folding both ends of each strip across the top of the unit towards each other,
   F. lapping one end of each strip over the other end of the same strip, and
   G. securing the ends of the same strip to each other.

References Cited by the Examiner

UNITED STATES PATENTS

| | | | |
|---|---|---|---|
| 1,273,227 | 7/1918 | Hren | 53—198 |
| 1,649,327 | 11/1927 | Sheldon | 53—198 |
| 2,768,489 | 10/1956 | Brown et al. | 53—26 |
| 2,885,839 | 5/1959 | Weiss | 53—159 X |
| 2,896,207 | 7/1959 | Wilson | 53—3 |
| 2,908,122 | 10/1959 | Allen | 53—26 X |
| 2,979,871 | 4/1961 | Kieckhefer | 53—3 |
| 3,126,680 | 3/1964 | Baird et al. | 53—3 |

TRAVIS S. McGEHEE, *Primary Examiner.*